United States Patent
Ravella et al.

(10) Patent No.: US 12,045,223 B2
(45) Date of Patent: Jul. 23, 2024

(54) METHOD AND SYSTEM FOR LOCK AFTER QUALIFICATION FOR UPDATE QUERIES

(71) Applicant: Microsoft Technology Licensing, LLC, Redmond, WA (US)

(72) Inventors: Chaitanya Sreenivas Ravella, Surrey (CA); Hanumantha Rao Kodavalla, Sammamish, WA (US); Prashanth Purnananda, Bellevue, WA (US); Craig Steven Freedman, Sammamish, WA (US); Vasileios Papadimos, Seattle, WA (US)

(73) Assignee: Microsoft Technology Licensing, LLP, Redmond, WA (US)

( * ) Notice: Subject to any disclaimer, the term of this patent is extended or adjusted under 35 U.S.C. 154(b) by 70 days.

(21) Appl. No.: 17/831,366

(22) Filed: Jun. 2, 2022

(65) Prior Publication Data
US 2023/0394028 A1    Dec. 7, 2023

(51) Int. Cl.
*G06F 16/23*    (2019.01)
*G06F 16/22*    (2019.01)

(52) U.S. Cl.
CPC ...... *G06F 16/2343* (2019.01); *G06F 16/2282* (2019.01); *G06F 16/2358* (2019.01)

(58) Field of Classification Search
CPC .............................. G06F 9/46; G06F 16/2343
USPC ........................................................ 707/704
See application file for complete search history.

(56) References Cited

U.S. PATENT DOCUMENTS

| 2004/0236746 | A1 | 11/2004 | Lomet |
| 2016/0042023 | A1* | 2/2016 | Leach ................ G06F 9/466 |
| | | | 707/703 |
| 2022/0092051 | A1 | 3/2022 | Miller et al. |

FOREIGN PATENT DOCUMENTS

EP    3111347 B1    5/2021

OTHER PUBLICATIONS

Berenson, et al., "A Critique of ANSI SQL Isolation Levels", In Proceedings of ACM SIGMOD Conference, Jun. 1995, 10 Pages.
Cahill, et al., "Serializable Isolation for Snapshot Databases", In Proceeding of ACM SIGMOD Conference, Jun. 9, 2008, pp. 729-738.
Fekete, et al., "A Read-Only Transaction Anomaly Under Snapshot Isolation", In Journal of ACM SIGMOD Record, vol. 33, Issue 3, Sep. 2004, pp. 12-14.
Graefe, Goetz, "On Transactional Concurrency Control", In Journal of Synthesis Lectures on Data Management, vol. 14, Issue 5, Jun. 2019, 407 Pages.

(Continued)

*Primary Examiner* — Hung T Vy
(74) *Attorney, Agent, or Firm* — ArentFox Schiff LLP

(57) ABSTRACT

Example aspects include techniques for anomaly detection via sparse judgmental samples. These techniques may include generating a qualified timestamp corresponding to execution of a first operation of a first transaction over a database and determining, based on the qualified timestamp, that a row of a table is not locked by a second operation of a second transaction over the database. In addition, the techniques may include determining that the row meets a condition of the first operation. Further, the techniques may include updating, based on the qualified timestamp, the row in response to the row meeting the condition, the updating including acquiring a lock on the row of the table.

20 Claims, 3 Drawing Sheets

(56) References Cited

OTHER PUBLICATIONS

Korotkevitch, Dmitri, "Pro SQL Server Internals", In Publication of Apress, Dec. 29, 2016, 805 Pages.

Kyte, Thomas, "Expert Oracle", In Publication of Apress, Jan. 2005, 26 Pages.

Mohan, C., "An Efficient Method for Performing Record Deletions and Updates Using Index Scans", In Proceedings of the 28th International Conference on Very Large Databases, Aug. 20, 2002, 10 Pages.

Mohan, et al., "ARIES/IM: An Efficient and High Concurrency Index Management Method Using Write-Ahead Logging", In Proceedings of ACM SIGMOD Conference, vol. 21, Issue 2, Jun. 1, 1992, pp. 371-380.

Mohan, C., "ARIES/KVL: A Key-Value Locking Method for Concurrency Control of Multiaction Transactions Operating on B-Tree Indexes", In Proceedings of VLDB Conference, Aug. 1990, pp. 392-405.

Mohan, C., "Commit_LSN: A Novel and Simple Method for Reducing Locking and Latching in Transaction Processing Systems", In Proceedings of VLDB Conference, Aug. 13, 1990, pp. 406-418.

Ponnekanti, Nagavamsi, "Pseudo Column Level Locking", In Proceedings of 17th International Conference on Data Engineering, Apr. 2, 2001, pp. 545-550.

Ports, et al., "Serializable Snapshot Isolation in PostgreSQL", In Repository of arXiv:1208.4179v1, Aug. 21, 2012, pp. 1850-1861.

Freedman, Craig, "Halloween Protection", Retrieved from: https://docs.microsoft.com/en-us/archive/blogs/craigfr/halloween-protection, Feb. 27, 2008, 5 Pages.

White, Paul, "The Halloween Problem—Part 1", Retrieved from: https://sqlperformance.com/2013/02/t-sql-queries/halloween-problem-part-1, Feb. 13, 2013, 7 Pages.

Antonopoulos, et al., "Constant Time Recovery in Azure SQL Database", In Proceedings of the VLDB Endowment, vol. 12, Issue 12, Jun. 2019, 12 Pages.

Zhou, et al., "Timestamp Reassignment: Taming Transaction Abort for Serializable Snapshot Isolation", In Journal of Frontiers of Computer Science, vol. 13, Issue 6, Jul. 16, 2019, pp. 1282-1295.

"International Search Report and Written Opinion Issued in PCT Application No. PCT/US23/018772", Mailed Date: Jul. 27, 2023, 12 Pages.

* cited by examiner

METHOD AND SYSTEM FOR LOCK AFTER QUALIFICATION FOR UPDATE QUERIES

BACKGROUND

Because a database system may be accessible by multiple processes, conflicts may occur if the processes are not properly coordinated. Examples of conflicts include two processes attempting to update the same database object at the same time with two different values, a process attempting to read a database object that is being deleted by another process, and a process attempting to update a database object that links to a related database object being updated by another process. When a conflict happens, the operations of processes that access the same or related database object may interleave in an unpredictable way, such that the results of the operations may be incorrect and may destroy the data consistency of the database system.

In some instances, database systems may use locks to maintain the consistency of databases when multiple processes are concurrently accessing the same data. For example, a database management system may use a semaphore that locks a database object when a process is accessing the database object, and releases the lock when the process finishes accessing the database object. All other processes must check the semaphore before accessing the database object to see if any process is currently using it. Unfortunately, conventional locking techniques have many drawbacks, e.g., locking may cause exorbitant amounts of memory usage and deadlocks. Moreover, as big data and/or database as a service usage increases, the disadvantages of locking will only be exacerbated by larger databases having larger transaction workloads.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In some aspects, the techniques described herein relate to a method including: generating a qualified timestamp corresponding to execution of a first operation of a first transaction over a database; determining, based on the qualified timestamp, that a row of a table is not locked by a second operation of a second transaction over the database; determining that the row meets a condition of the first operation; and updating, based on the qualified timestamp, the row in response to the row meeting the condition, the updating including acquiring a lock on the row of the table.

In some aspects, the techniques described herein relate to a non-transitory computer-readable device having instructions thereon that, when executed by at least one computing device, cause the at least one computing device to perform operations including: generating a qualified timestamp corresponding to execution of a first operation of a first transaction over a database; determining, based on the qualified timestamp, that a row of a table is not locked by a second operation of a second transaction over the database; determining that the row meets a condition of the first operation; and updating, based on the qualified timestamp, the row in response to the row meeting the condition, the updating including acquiring a lock on the row of the table.

In some aspects, the techniques described herein relate to a system including: a memory storing instructions thereon; and at least one processor coupled with the memory and configured by the instructions to: generate a qualified timestamp corresponding to execution of a first operation of a first transaction over a database; determine, based on the qualified timestamp, that a row of a table is not locked by a second operation of a second transaction over the database; determine that the row meets a condition of the first operation; and update, based on the qualified timestamp, the row in response to the row meeting the condition, the updating including acquiring a lock on the row of the table.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
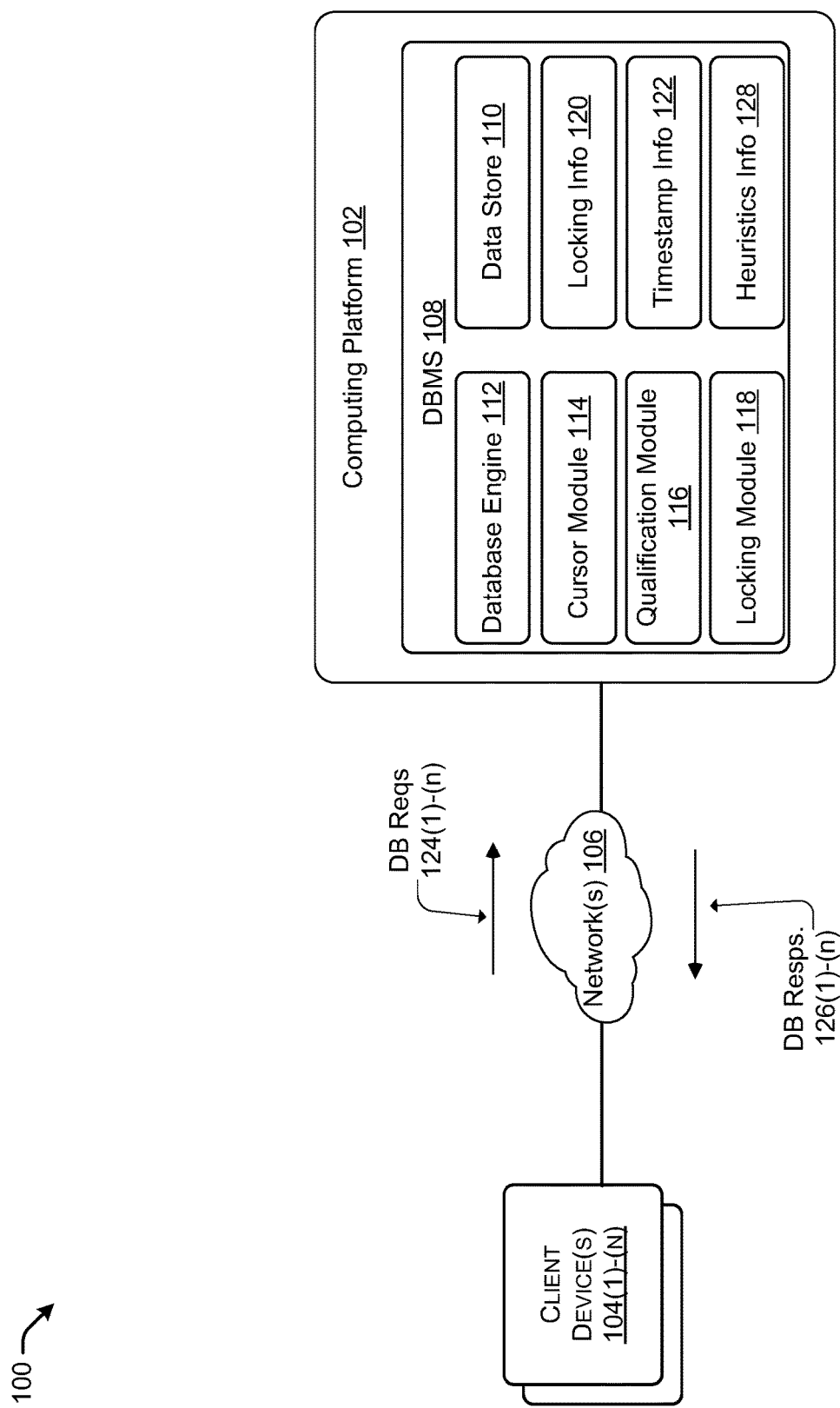
FIG. 1 illustrates an example architecture of a database management system, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for implementing a database lock after qualification for update operations/statements. Database systems may use locks to maintain the consistency of databases when multiple processes are concurrently accessing the same data. Otherwise, processes that access the same or related data may interleave in an unpredictable way, such that the results of the operations may be incorrect and may destroy the data consistency of the database system. However, locking may be expensive and cause exorbitant amounts of memory usage and even deadlocks, i.e., a situation in which two or more processes are waiting for one another to give up locks and remain at a standstill until the deadlock is detected and one of the processes is aborted. For example, in some database systems, when executing a database operation, the database system may acquire a lock on a target row before qualifying the target row as a row that meets a condition of the database operation. This may result in excessive locking and blocking, which may cause longer computation times and deadlocks at scale.

Aspects of the present disclosure provide a database management system configured to lock a database object during execution of a database operation after confirming that the database object meets a condition of the operation. In particular, the present techniques include generating a snapshot timestamp at the start of a database operation that may modify database data. For example, a database engine may generate a snapshot timestamp at the beginning of an UPDATE command having a WHERE clause. Additionally, the present techniques include qualifying the unlocked database rows visible as of the snapshot timestamp based on a condition of the database operation. For example, the database engine may identify the unlocked database rows that meet the condition of the WHERE clause and are visible as of the snapshot timestamp. Further, the present techniques include updating the qualified database rows that have a last commit timestamp that precedes the snapshot timestamp using a lock. For example, the database engine may update the identified rows that have not been committed to after the snapshot timestamp in accordance with the UPDATE command.

Accordingly, the present techniques employ locking after qualification to improve system performance by preventing or reducing unnecessary locking and/or blocking. The benefits of the present techniques have significant importance in cloud computing and big data contexts where the disadvantages of locking are exacerbated by large database sizes and workloads.

Illustrative Environment

FIG. 1 is a diagram showing an example architecture of a database management system, in accordance with some aspects of the present disclosure.

As illustrated in FIG. 1, the computing system 100 may include a computing platform 102, a plurality of client devices 104(1)-(n), and one or more networks 106(1)-(n). Some examples of the client devices 104(1)-(n) include computing devices, smartphone devices, Internet of Things (IoT) devices, drones, robots, process automation equipment, sensors, control devices, vehicles, transportation equipment, tactile interaction equipment, virtual and augmented reality (VR and AR) devices, industrial machines, virtual machines, etc. The network(s) 106 may comprise any one or combination of multiple different types of networks, such as cellular networks, wireless networks, local area networks (LANs), wide area networks (WANs), personal area networks (PANs), the Internet, or any other type of network configured to communicate information between computing devices (e.g., the computing platform 102, and the client devices 104(1)-(N)).

Further, the computing platform 102 may include a database management system (DBMS) 108. The DBMS 108 may be configured to organize a collection of data on a data store 110. In some aspects, the DBMS 108 and the data store 110 may reside on a single storage device or system or on multiple storage devices or systems such as available at one or more data centers. Further, the DBMS 108 may include various types of database services (e.g., relational, non-relational, structured query language (SQL), noSQL) for storing, querying, and updating data. The data store 110 may include database objects. In some aspects, a database object may include a database table that organizes data in columns and rows. Each row represents a unique record, and each column represents a field within the record. For example, a table of contact addresses may include a row for each person and columns for first name, last name, street address, city, state, and/or zip code.

In some aspects, the computing platform 102 may be a multi-tenant environment that provides the client devices 104(1)-(n) with distributed storage and access to software, services, files, and/or data via one or more network(s) 106. In a multi-tenancy environment, one or more system resources of the computing platform 102 are shared among tenants but individual data associated with each tenant is logically separated. Some examples of the system resources may include computing units, bandwidth, data storage, application gateways, software load balancers, memory, field programmable gate arrays (FPGAs), graphics processing units (GPUs), input-output (I/O) throughput, or data/instruction cache. For example, the computing platform 102 may be a cloud computing device, and the DBMS may be a platform as a service (PaaS) or database as a service (DaaS). Further, in some aspects, a client device 104 may include one or more applications configured to interface with the computing platform 102 and/or one or more cloud applications deployed on the computing platform 102. The client devices 104(1)-(n) may be associated with customers (i.e., tenants) of the operator of the computing platform 102 or end-users that are subscribers to services and/or applications of the customers that are hosted on the computing platform 102 and provided by the customers to the end users via the computing platform 102.

As illustrated in the FIG. 1, the DBMS 108 may include a database engine 112, a cursor module 114, a qualification module 116, a locking module 118, locking information 120, and timestamp information 122. The database engine 112 may be configured to perform data retrieval and data manipulation. In particular, the database engine 112 may receive database requests 124(1)-(n). Further, in some aspects, the database engine 112 may generate a database responses 126(1)-(n) based on the database requests 124(1)-(n).

For example, the database engine 112 may receive a database request 124 in a query language and/or a data manipulation language. Further, the database engine 112 may be configured to execute the database request 124 over the database objects of the data store 110. In some examples, a database request 124 may be or include a transaction. As used herein, in some aspects, a "transaction" may refer to a single unit of transactional functionality, which includes one or more operations (i.e., statements) to be performed on various objects (e.g., database objects, key-value store objects, etc.). In some aspects, a single transaction may include many different operations, to be executed as a unit by the database engine 112, such that all such operations are successfully completed, or none of them succeed, at the termination of the transaction's execution. In some aspects, a transaction may be characterized as an atomic unit of consistency and recovery. Further, a transaction may include multiple data manipulation and definition operations constituting a single transaction.

In addition, the database engine 112 may employ a commit protocol to ensure that no permanent change is made in a data object, or no change visible to other nodes of the system, until a "commit" is executed. As used herein, in some aspects, to "commit" a transaction may refer to finalizing the results of a transaction in a data base. A transaction that does not commit is said to abort. Among the reasons a transaction might abort are that power might fail, a system might crash, a concurrency conflict with another transaction might arise, or a user (or his application program) might detect another error and explicitly abort.

Further, in some aspects, the database engine 112 may receive the database requests 124(1)-(n) and generate the query representations corresponding to the database requests 124(1)-(n). In some aspects, a query representation may be a query plan. As used herein, a "query plan" may refer to one or more operations for executing a database request 124 over data. Further, in some aspects, a database request 124 may include a first plurality of operations and the query representation may include a second plurality of operations that are optimized to perform the database request 124 over the data store 110.

The cursor module 114 may employ read cursors to read database objects from the data store 110 and write cursors to write to database objects in the data store 110. In some aspects, the cursor module 114 may employ read and write cursors based on a query representation. For example, a read cursor may read a database object based on a query representation, and a write cursor may write to the database object based on a query representation. Further, in some aspects, a read cursor may skip reading a database object if the database object is locked.

The qualification module 116 may determine whether a condition of a database request 124 or a corresponding query plan is met by one or more rows read by a read cursor. Further, in some aspects, if the qualification module 116 determines that a database object meets a condition of an operation, the database engine 112 may instruct the locking module 118 to lock a database object, e.g., a row of a database table. Additionally, in some aspects, if the qualification module 116 determines that a database object meets a condition of an operation, the database engine 112 may instruct the write cursor to write to a database. In addition, in some aspects, if the qualification module 116 determines that a database object meets a condition of an operation, the database engine 112 may instruct the locking module 118 to lock a database object, e.g., a row of a database table.

The locking module 118 be configured to lock database objects of the data store 110. In some instances, locking a database object may include issuing a lock to an operation and/or transaction. As used herein, in some aspects, a "lock" may be a mechanism for assigning rights to a database object to an operation and/or transaction. For example, a first transaction may lock a particular database object so as to ensure that no other transaction accesses that database object until the first transaction commits or aborts. In some aspects, a lock may be semaphore. Further, in some aspects, the locking module 118 may employ different types of locks (e.g., share locks, update locks, exclusive locks). Additionally, the locking module 118 may issue locks for different periods of time and/or at different hierarchical levels of a database (e.g., table, record, field/value). For example, an update lock may only be held for the duration of an update while an exclusive lock may be held until the end of the transaction. In addition, in some aspects, the locking module 118 may store lock assignments as the locking information 120. Further, the locking information 120 for requalification may be stored in-memory for performance benefits unlike other more expensive solutions that abort operations during requalification and employ updates to each row by writing to disk even though the row may not qualify later when selecting the rows during qualification. Blocking occurs when two processes need to access to same piece of data concurrently so one process locks the data and the other one needs to wait for the other one to complete and release the lock. Deadlock occurs when one process is blocked and waiting for a second process to complete its work and release a lock, while the second process at the same time is blocked and waiting for the first process to release a lock.

As described in detail herein, in some aspect the DBMS 108 may employ locking a database object by the locking module 118 after qualification of the database object by the qualification module 116 instead of qualifying a database object after locking the database object, which can lead to excessive locking having a negative impact on system performance. For example, at the beginning of execution of a database request 124, the database engine 112 may generate a qualified timestamp (i.e., a timestamp identifying the time of the last evaluation by the qualification module 116) for the database request 124 and store the qualified timestamp within the timestamp information 122. In some example, the timestamp information 122 may be stored with a disk write to a storage device as opposed to in-memory. Further, the database engine 112 may employ the read cursor of the cursor module 114 to read database objects of the data store 110 based on a query representation of a database request 124, and provide the database object to the qualification module 116 for qualification. Additionally, the read cursor may skip database objects that are locked and read the database objects that are visible as of the most recent qualified timestamp of the database object. If a database object is found to be qualified for a condition, the write cursor of the cursor module 114 may perform the following operations: (1) determine that a transaction identifier assigned to the database object does not correspond to an active transaction or wait until an active transaction associated with the database object is complete, (2) determine whether the last commit timestamp to the database object is greater than the qualified timestamp for the database object, and (3) if the commit was performed before the qualified timestamp (i.e., the database object was not modified after the current transaction read the database object), the database engine 112 may lock the database object using an exclusive lock and update the database object, or if the commit was performed after the qualified timestamp (i.e., the database object was modified after the current transaction read the database object), the database engine 112 may update the qualified timestamp, instruct the qualification module 116 to re-evaluate the database object when the database object is not locked, and lock and update the database object if the database object is determined to be qualified by the qualification module 116. In some aspects, locking the data object prior to the updating the data object may provide backwards compatibility with other existing features of the database engine 112.

Additionally, in some aspects, the qualification module 116 may be unable to perform requalification for an operator employed within a database request 124. For example, in some aspects, the qualification module 116 may be unable to perform requalification of at least one of the following operators: spool, sort, split, collapse, hash join, merge join, top, exchange, and/or range prefetch. Consequently, in some aspects, the database engine 112 may be configured to identify an unsupported operator and abort lock after qualification for the operation, and re-try with lock before qualification (e.g., the database engine may perform lock before qualification using in-memory locks taken on read cursor). Additionally, or alternatively, in some aspects, the database engine 112 may only attempt requalification for a predetermined number of attempts (e.g., one attempt).

TABLE 1

| Employee Identifier | Salary | Manager |
|---|---|---|
| 1 | 120,000 | Peter |
| 2 | 100,000 | Hanuma |
| 3 | 85,000 | Peter |
| 4 | 96,000 | Hanuma |

As another example, the database engine 112 may receive a first database request 124(1) including at least the following first operation: "update emp set salary=salary*1.1 where manager='Peter'" over a database table as illustrated in Table 1. Further, the database engine may receive a second database request 124(2) including at least the following second operation: "update emp set salary=salary*1.11 where manager='Hanuma'" over the database table as illustrated in Table 1. In a locking before qualification context, the above two database requests 124(1)-(2) may block each other even though the database requests 124(1)-(2) are meant to affect two different sets of rows. For example, the database engine 112 may begin execution of database request 124(1) as a transaction, and perform the first operation (i.e., the update statement of database request 124(1)). Further, even when the update statement is performed, if all of the operations of the database request 124(1) have not been fully completed, the database request 124(1) will still hold locks on the first and third rows of Table 1. Consequently, during execution of the second database request 124(2), the second operation (i.e., the update statement of database request 124(2)) will lock the first row and be blocked by the first database request 124(1). In a qualification before locking context, as described in detail herein, during execution of the second database request 124(2), the second operation (i.e., the update statement of database request 124(2)) will determine if the first row is qualified before locking the first row. Given that the first row does not qualify for the second operation, the second operation will not lock the first row and will not be blocked.

In some aspects, the database engine 112 may collect heuristics information 128 during execution of the database requests 124(1)-(n). Further, the database engine 112 may determine whether to perform lock after qualification or lock before qualification based on the heuristics information 128. For example, the database engine 112 may monitor the success and failure of the database requests 124(1)-(n) (e.g., the database requests 124(1)-(n) that are able to complete without requalification when using lock after qualification and the database requests 124(1)-(n) that are unable to complete without requalification when using lock after qualification), and determine to employ lock after qualification when an amount of wasted work is above a predefined threshold. In some aspects, the above-described feedback mechanism applied to database requests 124 that include operators where requalification logic is not supported. In addition, the database engine 112 may determine wasted work based on at least one of CPU time before abortion of an unsuccessful database request 124, number of rows evaluated before abortion of an unsuccessful database request 124. Additionally, or alternatively, the database engine 112 may determine whether to the apply lock after qualification based on total CPU time for database requests 124(1)-(n) that had a conflict on at least one row and had to wait for row lock, the number of database requests 124(1)-(n) executed where a database request 124 had a conflict on at least one row and had to wait for row lock, total CPU time used by database requests 124(1)-(n) that completed successfully without any conflicts from concurrent queries, and total queries ran with this index as read cursor successfully without any conflicts from concurrent queries.

Example Processes

Figure 2:
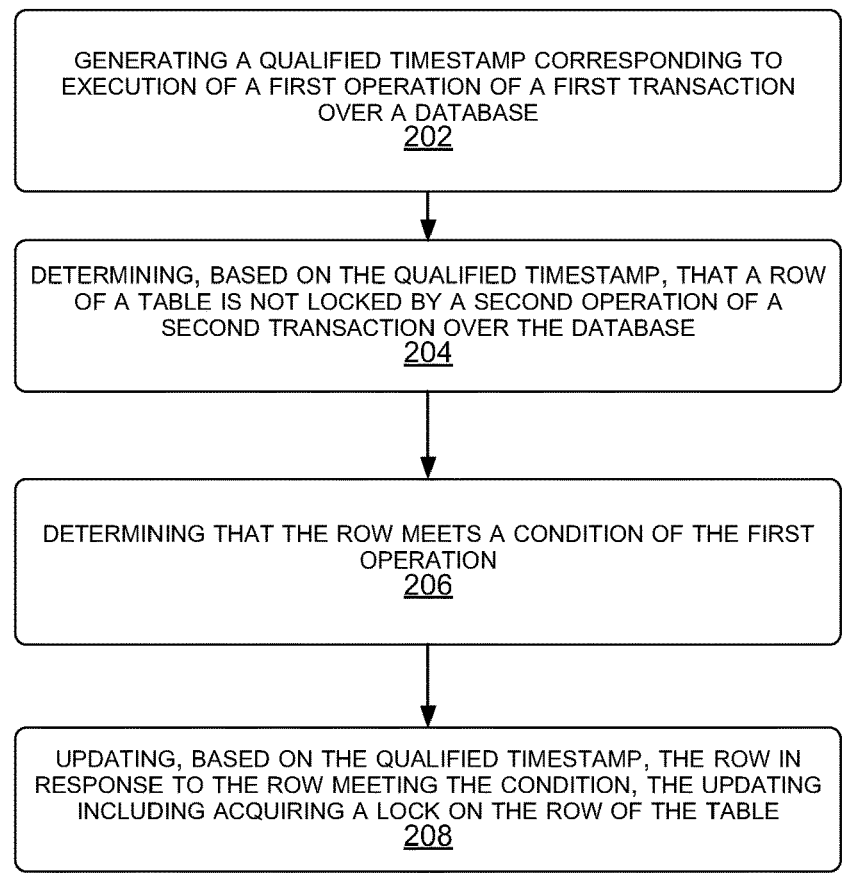
FIG. 2 is a flow diagram illustrating an example method for implementing a database lock after qualification for update queries, in accordance with some aspects of the present disclosure.

FIG. 2 is a flow diagram illustrating an example method 200 for implementing anomaly detection, in accordance with some aspects of the present disclosure. The method 200 may be performed by one or more components of the computing platform 102, the computing device 300, or any device/component described herein according to the techniques described with reference to the previous figures.

At block 202, the method 200 may include generating a qualified timestamp corresponding to execution of a first operation of a first transaction over a database. For example, database engine 112 may generate a qualified timestamp within the timestamp information 122 at the beginning of execution of a database request 124 including at least a first database operation.

Accordingly, the computing platform 102, the DBMS 108, the computing device 300, and/or the processor 302 executing the database engine 112 may provide means for generating a qualified timestamp corresponding to execution of a first operation of a first transaction over a database.

At block 204, the method 200 may include determining, based on the qualified timestamp, that a row of a table is not locked by a second operation of a second transaction over the database. For example, a read cursor of the cursor module 114 may read a row of the data store 110 based on the row not being locked by a second database operation.

Accordingly, the computing platform 102, the DBMS 108, the database engine 112, the computing device 300, and/or the processor 302 executing the cursor module 114 may provide means for determining, based on the qualified timestamp, that a row of a table is not locked by a second operation of a second transaction over the database.

At block 206, the method 200 may include determining that the row meets a condition of the first operation. For example, the qualification module 116 may determine that a condition of the first database operation within the database request 124 is met by the row of the data store 110.

Accordingly, the computing platform 102, the DBMS 108, the database engine 112, the computing device 300, and/or the processor 302 executing the qualification module 116 may provide means for determining that the row meets a condition of the first operation.

At block 208, the method 200 may include updating, based on the qualified timestamp, the row in response to the row meeting the condition, the updating including acquiring a lock on the row of the table. For example, the locking module 118 may issue a lock for the row to the operation and/or the database request 124 including the operation. Further, the write cursor of the cursor module 114 may update the row in accordance with the operation, and the locking module 118 may unlock the row. In some aspects, locking the data object prior to the updating the data object may provide backwards compatibility with other existing features of the database engine 112.

Accordingly, the computing platform 102, the DBMS 108, the database engine 112, the computing device 300, and/or the processor 302 executing the cursor module 114 and the locking module may provide means for updating, based on the qualified timestamp, the row in response to the row meeting the condition, the updating including acquiring a lock on the row of the table.

In some aspects, the techniques described herein relate to a method, wherein the row is a first row of the table, and further including skipping determining whether one or more other rows of the table meet the condition based on the one or more other rows being locked by one or more other operations.

In some aspects, the techniques described herein relate to a method, wherein updating the row in response to the row meeting the condition includes: determining that the row is not associated with an active transaction executed over the database; and updating the row in response to determining that the row is not associated with the active transaction.

In some aspects, the techniques described herein relate to a method, wherein updating the row in response to the row meeting the condition includes: determining that the row is associated with a third transaction that is active; waiting until the third transaction is inactive with respect to the row; associating the first transaction with the row in response to the third transaction being inactive with respect to the row; and updating the row in response to associating the first transaction with the row.

In some aspects, the techniques described herein relate to a method, wherein updating the row in response to the row meeting the condition includes: determining that the qualified timestamp is greater than a commit timestamp indicating a last modification to the row; and updating the row in response to the qualified timestamp being greater than the commit timestamp.

In some aspects, the techniques described herein relate to a method, wherein determining that the row meets the condition of the first operation includes determining that the row meets the condition of the first operation at a first period in time, and wherein updating the row in response to the row meeting the condition includes: determining that a commit timestamp is greater than or equal to the qualified timestamp, the commit timestamp indicating a last modification to the row; determining, based on the commit timestamp is greater than or equal to the qualified timestamp, that the row meets the condition of the first operation at a second period in time; and updating the row in response to the row meeting the condition of the first operation at a second period in time.

In some aspects, the techniques described herein relate to a method, wherein the lock is an exclusive lock, and further including releasing the exclusive lock after the row is updated.

In some aspects, the lock after qualification may only be employed for database requests 124 using read committed isolation and/or when read committed snapshot is enabled at a database level.

In some aspects, the techniques described herein relate to a method, further comprising determining that a request success rate for a plurality of database requests including an unsupported operator is above a predefined threshold; and wherein generating the qualified timestamp comprises generating the qualified timestamp based at least in part on the request success rate being greater than the predefined threshold.

In some aspects, the techniques described herein relate to a method, wherein the row is a first row, and further comprising generating a qualified timestamp corresponding to execution of a third operation of a third transaction over a database; determining, based on the qualified timestamp, that a second row of the table is not locked by a fourth operation of a fourth transaction over the database; determining that a commit timestamp is greater than or equal to the qualified timestamp, the commit timestamp indicating a last modification to the row; and aborting the third operation based on the third operation including an unsupported operator and the commit timestamp being greater than or equal to the qualified timestamp.

While the operations are described as being implemented by one or more computing devices, in other examples various systems of computing devices may be employed. For instance, a system of multiple devices may be used to perform any of the operations noted above in conjunction with each other.

Illustrative Computing Device

Figure 3:
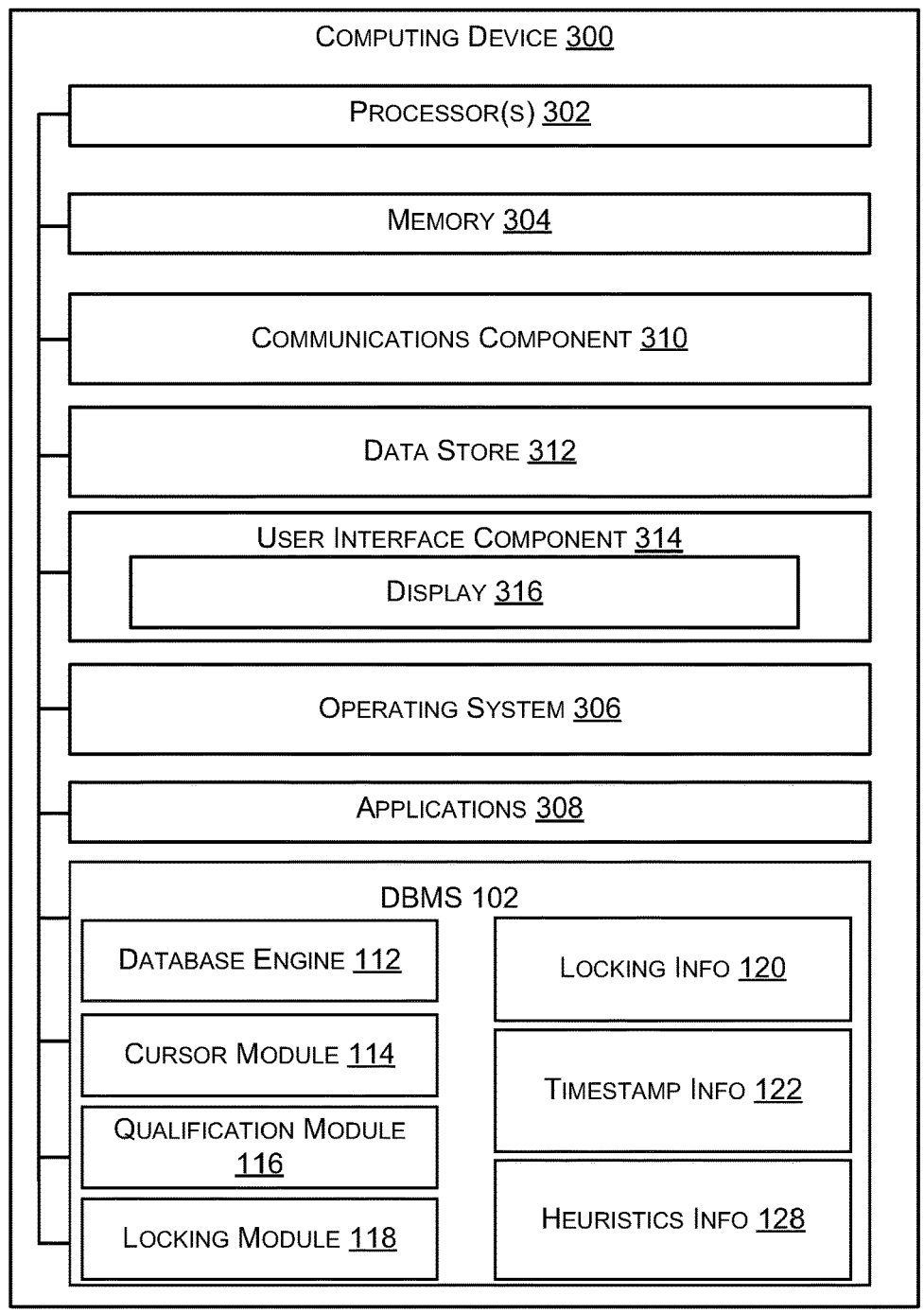
FIG. 3 is a block diagram illustrating an example of a hardware implementation for a computing device(s), in accordance with some aspects of the present disclosure.

Referring now to FIG. 3, an example of a computing device(s) 300 (e.g., the computing platform 102). In one example, the computing device(s) 300 includes the processor 302 for carrying out processing functions associated with one or more of components and functions described herein. The processor 302 can include a single or multiple set of processors or multi-core processors. Moreover, the processor 302 may be implemented as an integrated processing system and/or a distributed processing system. In an example, the processor 302 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 302 may include other processing components such as one or more arithmetic logic units (ALUs), registers, or control units.

In an example, the computing device 300 also includes memory 304 for storing instructions executable by the processor 302 for carrying out the functions described herein. The memory 304 may be configured for storing data and/or computer-executable instructions defining and/or associated with the database engine 112, the cursor module 114, the qualification module 116, the locking module 118, the locking information 120, and the timestamp information 122, and the processor 302 may execute the database engine 112, the cursor module 114, the qualification module 116. An example of memory 304 may include, but is not limited to, a type of memory usable by a computer, such as random access memory (RAM), read only memory (ROM), tapes, magnetic discs, optical discs, volatile memory, non-volatile memory, and any combination thereof. In an example, the memory 304 may store local versions of applications being executed by processor 302.

The example computing device 300 may include a communications component 310 that provides for establishing and maintaining communications with one or more parties utilizing hardware, software, and services as described herein. The communications component 310 may carry communications between components on the computing device 300, as well as between the computing device 300 and external devices, such as devices located across a communications network and/or devices serially or locally connected to the computing device 300. For example, the communications component 310 may include one or more buses, and may further include transmit chain components and receive chain components associated with a transmitter and receiver, respectively, operable for interfacing with external devices.

The example computing device 300 may include a data store 312, which may be any suitable combination of hardware and/or software, that provides for mass storage of information, databases, and programs employed in connection with implementations described herein. For example, the data store 312 may be a data repository for the operating system 306 and/or the applications 308.

The example computing device 300 may include a user interface component 314 operable to receive inputs from a user of the computing device 300 and further operable to generate outputs for presentation to the user. The user interface component 314 may include one or more input devices, including but not limited to a keyboard, a number pad, a mouse, a touch-sensitive display (e.g., display 316), a digitizer, a navigation key, a function key, a microphone, a voice recognition component, any other mechanism capable of receiving an input from a user, or any combination thereof. Further, the user interface component 314 may include one or more output devices, including but not limited to a display (e.g., display 316), a speaker, a haptic feedback mechanism, a printer, any other mechanism capable of presenting an output to a user, or any combination thereof.

In an implementation, the user interface component 314 may transmit and/or receive messages corresponding to the operation of the operating system 306 and/or the applications 308. In addition, the processor 302 executes the operating system 306 and/or the applications 308, and the memory 304 or the data store 312 may store them.

Further, one or more of the subcomponents of the computing platform 102, the database engine 112, the cursor module 114, the qualification module 116, may be implemented in one or more of the processor 302, the applications 308, the operating system 306, and/or the user interface component 314 such that the subcomponents of the computing platform 102, the database engine 112, the cursor module 114, the qualification module 116 are spread out between the components/subcomponents of the computing device 300.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Non-transitory computer-readable media excludes transitory signals. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Conclusion

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A method comprising:
generating a qualified timestamp corresponding to execution of a first operation of a first transaction over a database;
determining, based on the qualified timestamp, that a row of a table is not locked by a second operation of a second transaction over the database;
determining that the row meets a condition of the first operation; and
updating, based on the qualified timestamp, the row in response to the row meeting the condition, the updating including acquiring a lock on the row of the table, wherein updating the row in response to the row meeting the condition comprises:
determining that the row is not associated with an active transaction executed over the data base; and
updating the row in response to determining that the row is not associated with the active transaction.

2. The method of claim 1, wherein the row is a first row of the table, and further comprising skipping determining whether one or more other rows of the table meet the condition based on the one or more other rows being locked by one or more other operations.

3. The method of claim 1, wherein updating the row in response to the row meeting the condition comprises:
determining that the qualified timestamp is greater than a commit timestamp indicating a last modification to the row; and
updating the row in response to the qualified timestamp being greater than the commit timestamp.

4. The method of claim 1, wherein determining that the row meets the condition of the first operation comprises determining that the row meets the condition of the first operation at a first period in time, and wherein updating the row in response to the row meeting the condition comprises:
determining that a commit timestamp is greater than or equal to the qualified timestamp, the commit timestamp indicating a last modification to the row;
determining, based on the commit timestamp being greater than or equal to the qualified timestamp, that the row meets the condition of the first operation at a second period in time; and
updating the row in response to the row meeting the condition of the first operation at a second period in time.

5. The method of claim 1, wherein the lock is an exclusive lock, and further comprising releasing the exclusive lock after the row is updated.

6. The method of claim 1, further comprising determining that a request success rate for a plurality of database requests including an unsupported operator is above a predefined threshold; and wherein generating the qualified timestamp comprises generating the qualified timestamp based at least in part on the request success rate being greater than the predefined threshold.

7. The method of claim 1, wherein the row is a first row, and further comprising:
- generating a qualified timestamp corresponding to execution of a third operation of a third transaction over a database;
- determining, based on the qualified timestamp, that a second row of the table is not locked by a fourth operation of a fourth transaction over the database;
- determining that a commit timestamp is greater than or equal to the qualified timestamp, the commit timestamp indicating a last modification to the row; and
- aborting the third operation based on the third operation including an unsupported operator and the commit timestamp being greater than or equal to the qualified timestamp.

8. A non-transitory computer-readable device having instructions thereon that, when executed by at least one computing device, cause the at least one computing device to perform operations comprising:
- generating a qualified timestamp corresponding to execution of a first operation of a first transaction over a database;
- determining, based on the qualified timestamp, that a row of a table is not locked by a second operation of a second transaction over the database;
- determining that the row meets a condition of the first operation; and
- updating, based on the qualified timestamp, the row in response to the row meeting the condition, the updating including acquiring a lock on the row of the table, wherein updating the row in response to the row meeting the condition comprises:
  - determining that the qualified timestamp is greater than a commit timestamp indicating a last modification to the row; and
  - updating the row in response to the qualified timestamp being greater than the commit timestamp.

9. The non-transitory computer-readable device of claim 8, wherein the row is a first row of the table, and the instructions thereon cause the at least one computing device to perform operations further comprising:
- skipping determining whether one or more other rows of the table meet the condition based on the one or more other rows being locked by one or more other operations.

10. The non-transitory computer-readable device of claim 8, wherein updating the row in response to the row meeting the condition comprises:
- determining that the row is not associated with an active transaction executed over the database; and
- updating the row in response to determining that the row is not associated with the active transaction.

11. The non-transitory computer-readable device of claim 8, wherein updating the row in response to the row meeting the condition comprises:
- determining that the row is associated with a third transaction that is active;
- waiting until the third transaction is inactive with respect to the row;
- associating the first transaction with the row in response to the third transaction being inactive with respect to the row; and
- updating the row in response to associating the first transaction with the row.

12. The non-transitory computer-readable device of claim 8, wherein the lock is an exclusive lock, and further comprising releasing the exclusive lock after the row is updated.

13. A system comprising:
- a memory storing instructions thereon; and
- at least one processor coupled with the memory and configured by the instructions to:
  - generate a qualified timestamp corresponding to execution of a first operation of a first transaction over a database;
  - determine, based on the qualified timestamp, that a row of a table is not locked by a second operation of a second transaction over the database;
  - determine that the row meets a condition of the first operation; and
  - update, based on the qualified timestamp, the row in response to the row meeting the condition, the updating including acquiring a lock on the row of the table, wherein to update the row in response to the row meeting the condition, the at least one processor is further configured by the instructions to:
    - determine that the row is associated with a third transaction that is active;
    - wait until the third transaction is inactive with respect to the row;
    - associate the first transaction with the row in response to the third transaction being inactive with respect to the row; and
    - update the row in response to associating the first transaction with the row.

14. The system of claim 13, wherein the row is a first row of the table, and the at least one processor is further configured by the instructions to skip determining whether one or more other rows of the table meet the condition based on the one or more other rows being locked by one or more other operations.

15. A method comprising:
- generating a qualified timestamp corresponding to execution of a first operation of a first transaction over a database;
- determining, based on the qualified timestamp, that a row of a table is not locked by a second operation of a second transaction over the database;
- determining that the row meets a condition of the first operation; and
- updating, based on the qualified timestamp, the row in response to the row meeting the condition, the updating including acquiring a lock on the row of the table, wherein updating the row in response to the row meeting the condition comprises:
  - determining that the row is associated with a third transaction that is active;
  - waiting until the third transaction is inactive with respect to the row;
  - associating the first transaction with the row in response to the third transaction being inactive with respect to the row; and
  - updating the row in response to associating the first transaction with the row.

16. A method comprising:
- generating a qualified timestamp corresponding to execution of a first operation of a first transaction over a database;
- determining, based on the qualified timestamp, that a row of a table is not locked by a second operation of a second transaction over the database;
- determining that the row meets a condition of the first operation; and
- updating, based on the qualified timestamp, the row in response to the row meeting the condition, the updating including acquiring a lock on the row of the table, wherein updating the row in response to the row meeting the condition comprises:

determining that the qualified timestamp is greater than a commit timestamp indicating a last modification to the row; and updating the row in response to the qualified timestamp being greater than the commit timestamp.

17. A non-transitory computer-readable device having instructions thereon that, when executed by at least one computing device, cause the at least one computing device to perform operations comprising:

generating a qualified timestamp corresponding to execution of a first operation of a first transaction over a database;

determining, based on the qualified timestamp, that a row of a table is not locked by a second operation of a second transaction over the database;

determining that the row meets a condition of the first operation; and updating, based on the qualified timestamp, the row in response to the row meeting the condition, the updating including acquiring a lock on the row of the table, wherein updating the row in response to the row meeting the condition comprises:

determining that the row is not associated with an active transaction executed over the data base; and updating the row in response to determining that the row is not associated with the active transaction.

18. A non-transitory computer-readable device having instructions thereon that, when executed by at least one computing device, cause the at least one computing device to perform operations comprising:

generating a qualified timestamp corresponding to execution of a first operation of a first transaction over a database;

determining, based on the qualified timestamp, that a row of a table is not locked by a second operation of a second transaction over the database;

determining that the row meets a condition of the first operation; and updating, based on the qualified timestamp, the row in response to the row meeting the condition, the updating including acquiring a lock on the row of the table, wherein updating the row in response to the row meeting the condition comprises:

determining that the row is associated with a third transaction that is active;

waiting until the third transaction is inactive with respect to the row;

associating the first transaction with the row in response to the third transaction being inactive with respect to the row; and updating the row in response to associating the first transaction with the row.

19. A system comprising:

a memory storing instructions thereon; and at least one processor coupled with the memory and configured by the instructions to:

generate a qualified timestamp corresponding to execution of a first operation of a first transaction over a database;

determine, based on the qualified timestamp, that a row of a table is not locked by a second operation of a second transaction over the database;

determine that the row meets a condition of the first operation; and update, based on the qualified timestamp, the row in response to the row meeting the condition, the updating including acquiring a lock on the row of the table, wherein to update the row in response to the row meeting the condition, the at least one processor is further configured by the instructions to:

determine that the row is not associated with an active transaction executed over the database; and update the row in response to the row meeting the condition in response to determining that the row is not associated with the active transaction.

20. A system comprising:

a memory storing instructions thereon; and at least one processor coupled with the memory and configured by the instructions to:

generate a qualified timestamp corresponding to execution of a first operation of a first transaction over a database;

determine, based on the qualified timestamp, that a row of a table is not locked by a second operation of a second transaction over the database;

determine that the row meets a condition of the first operation; and update, based on the qualified timestamp, the row in response to the row meeting the condition, the updating including acquiring a lock on the row of the table, wherein to update the row in response to the row meeting the condition, the at least one processor is further configured by the instructions to:

determine that the qualified timestamp is greater than a commit timestamp indicating a last modification to the row; and update the row in response to the qualified timestamp being greater than the commit timestamp.

* * * * *